(12) United States Patent
Kruempelmann (10) Patent No.: US 8,924,530 B2
(45) Date of Patent: Dec. 30, 2014

(54) MULTI-PHASE MONITORING OF HYBRID SYSTEM LANDSCAPES

(75) Inventor: Wulf Kruempelmann, Altlussheim (DE)

(73) Assignee: SAP SE, Walldorf (DE)

( * ) Notice: Subject to any disclaimer, the term of this patent is extended or adjusted under 35 U.S.C. 154(b) by 588 days.

(21) Appl. No.: 13/323,809

(22) Filed: Dec. 12, 2011

(65) Prior Publication Data

US 2013/0151682 A1    Jun. 13, 2013

(51) Int. Cl.
*G06F 15/173* (2006.01)

(52) U.S. Cl.
USPC .......................................... 709/223; 709/224

(58) Field of Classification Search
CPC .... G06Q 10/06; G06Q 10/025; H04N 21/262
See application file for complete search history.

(56) References Cited

U.S. PATENT DOCUMENTS

| | | | |
|---|---|---|---|
| 2002/0194319 A1* | 12/2002 | Ritche | 709/223 |
| 2005/0084086 A1* | 4/2005 | Hesse | 379/202.01 |
| 2009/0125367 A1* | 5/2009 | Brink et al. | 705/9 |

* cited by examiner

*Primary Examiner* — Peling Shaw (57) ABSTRACT

A multi-phase monitoring of hybrid system landscapes is described. Calendar data for planned and unplanned downtimes is generated at a number of computer system environments of a hybrid system landscape. Generated calendar data is requested from a computer system environment hosted by a first entity. Generated calendar data for at least one downtime of at least one component of a computer system environment hosted by a second entity is synchronized with calendar data for at least one downtime of at least one component of the computer system environment hosted by the first entity received in response of the request. Availability of the hybrid system landscape is evaluated based on the synchronized calendar data.

20 Claims, 6 Drawing Sheets

MULTI-PHASE MONITORING OF HYBRID SYSTEM LANDSCAPES

BACKGROUND

A hybrid computer system landscape is characterized by including at least two distinct parts, e.g., separate computer system environments. Typically, one such environment is locally built, e.g., on-premise, and another environment is hosted by a third party. The entities use hybrid computer system landscapes to execute different types of distributed work or business processes across the distinct parts. Thus, a task or a group of tasks of a business process runs locally while another task, group of tasks, or even different parts of the same task of the business process may run at the third party. For example, the mobile workforce of a company needs on-demand access to pertinent data and functionality to facilitate onsite activities related to various business processes. Such pertinent on-demand data and functionality may be hosted by a third party Web-services provider. The same business processes executed on-demand by the mobile workforce may require operations or at least data exchange with the on-premise computer system environment of the company. For example, the on-demand operations of a business process may involve changing the data for a particular customer, registering onsite purchase request, etc. The on-premise operations of the same business process may include updating the customer master data, generating and processing of purchase orders, backend accounting, etc.

Generally, the execution of distributed business processes are characterized with higher risks based from the lack of centralized control over the availability and operability of the hybrid computer system landscapes. Often, the entities maintaining spread business processes are required to ensure a certain level of availability of the different parts of the involved hybrid computer system environments. Therefore, such entities apply various direct and indirect techniques to control the entire business processes distributed across hybrid landscapes. Often, the companies providing the business processes rely on different service-level agreements with the hosting third parties. The only possibility for direct control is based on offline, and usually post-hoc reporting for the planned and/or encountered availability of the on-demand services.

SUMMARY

Various embodiments of systems and methods for multi-phase monitoring of hybrid system landscapes are described herein. Calendar information for planned and unplanned downtimes is collected at a number of computer system environments of a system landscape. According to one aspect, a central computer system environment of the hybrid landscape requests the collected calendar data from a service provider hosting separate computer system environment. According to another aspect, the calendar information received from the service provider is consolidated with the local calendar information. The consolidation of the calendar information could include synchronization of the downtimes of the systems of the local environment with the downtimes of the systems of the hosted environment. According to yet another aspect, the availability of at least one business process executed in the hybrid system landscape is reported based on the consolidated calendar information.

These and other benefits and features of the embodiments will be apparent upon consideration of the following detailed description of preferred embodiments thereof, presented in connection with the following drawings.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for multi-phase monitoring hybrid computer system landscapes are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
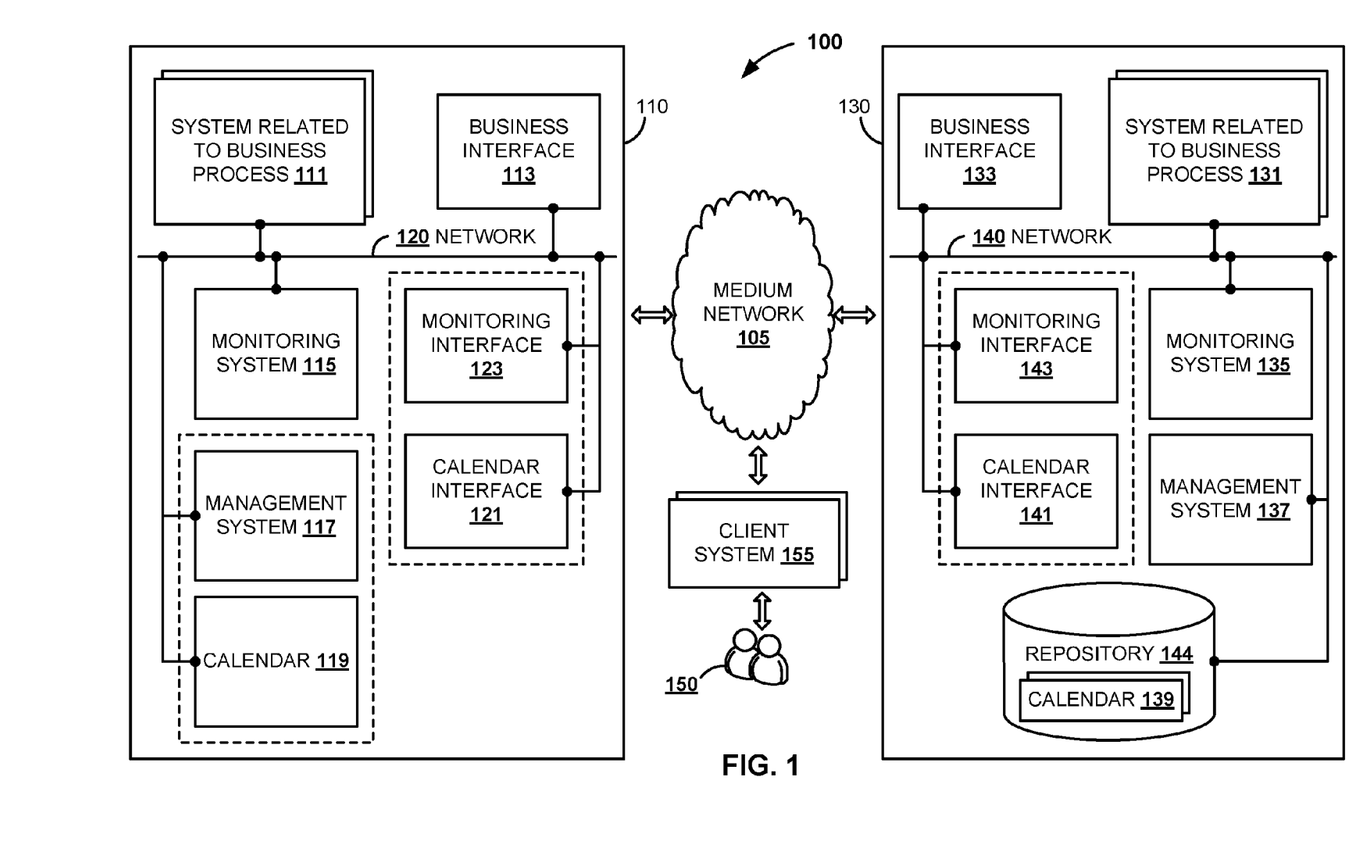
FIG. 1 is a block diagram illustrating a hybrid computer system landscape, according to one embodiment.

FIG. 1 is a block diagram showing exemplary hybrid computer system landscape 100 including computer system environments 110 and 130. In one embodiment, computer system environment 110 is hosted by a third party. For example, environment 110 may be implemented and provided over a cloud. In this document such third party hosting a computer system environment in a hybrid computer system landscape will be called service provider. In one embodiment, the computer system environment 110 may enable a predefined set of Web-services available on demand. These Web-services may correspond to different tasks or operations related to one or more distributed business processes running across the hybrid computer system landscape 100.

For example, the company SAP AG is a service provider of a group of on-demand services combine under the trade name Business ByDesign®. Respectively, SAP AG hosts a computer system environment where an entity may execute a number of business processes. At the same time, SAP AG is a vendor of on-premise enterprise business systems. An entity or company, customer of SAP AG, can build an on-premise computer system environment to execute a number of business processes using the solutions provided by SAP AG. In a hybrid landscape scenario, mobile users may instantiate or execute business processes at an on-demand computer system environment, e.g., managing customer data in customer relationship management (CRM) ByDesign® system hosted by SAP AG. The same business process may also include backend operations that are processed on-premise systems, such as updating customer records at enterprise resource planning (ERP) business solution provided by SAP AG.

In one embodiment, the hosted computer system environment 110 includes at least one system 111 related to business processes. For example, the at least one system may be embodied by a computer system configured to run one or more computer business applications. In one embodiment, such computer business applications can be lightweight on-demand versions of one or more computer business applications run in the on-premise computer system environment. Generally, the term "system" or "subsystem", as used in this document, refers to one or more computer applications running on one or more computer system configurations within a computer system environment to provide particular functionality.

The services provided by system 111 provide functionality corresponding to at least one task or operation of business processes running across the hybrid computer system landscape 100. Typically, the operations or tasks executed by business process related system 111 utilize business interface 113 to exchange data with the other elements of the hybrid computer system landscape 100. In one embodiment, business interface 113 exposes the available data and functionality of the at least one system 111 as a set of various Web-services. Further, the business interface 113 may provide physical port through which systems 111 exchange data outside the hosted computer system environment 110.

Normally, service providers ensure complex and reliable mechanisms for monitoring and managing the operability and availability of the computer system environments they host. Monitoring system 115 and management system 117 illustrate components of computer system environment 110 that are dedicated to monitoring and managing the rest of the components of the service provider environment, including the at least one system 111. Managing and monitoring may include a variety of automated administrative tasks, depending on the exact implementation of the computer system environment 110. Generally, such tasks are related to monitoring the availability and performance of the at least one system 111 related to one or more business processes spread across the hybrid computer system landscape 100. Therefore, the functionality of system 111 could be enhanced to provide monitoring and management data to systems 115 and 117, respectively.

In one embodiment, monitoring system 115 and management system 117 are separate components of the computer system environment 110 hosted by a service provider. Alternatively, the monitoring system 115 and the management system 117 components could be integrated into a single system. Further, one or both of the monitoring system 115 and the management system 117 can be part of the at least one system 111. The different components of the service provider environment 110 communicate with each other via network 120.

The computer system environment 130 is built on-premise, e.g., implemented by the company or entity providing the business processes executed in the hybrid computer system landscape 100. In one embodiment, the computer system environment 130 may have a structure and components similar to those of the hosted computer system environment 110. Similarly, at least one system 131 is included to execute tasks or operations related to one or more business processes running across the hybrid computer system landscape 100. The at least one system 131 utilizes business interface 133 to expose its functionality, and to exchange requests and data relevant to the distributed business processes with the other elements of the hybrid computer system landscape 100. Monitoring system 135 and management system 137 control the work of the components of the on-premise computer system environment 130. In one embodiment, the different components of computer system environment 130 communicate with each other via network 140. In one embodiment, the monitoring system 135 and/or management system 137 may be integrated with the at least one system 131, e.g., as additional modules. In one embodiment, a single system or module may be responsible for both monitoring and managing the on-premise computer system environment 130.

The computer system environment 110 hosted by a service provider and the on-premise computer system environment 130 can communicate via medium network 105. The network 105 may be based on different network technologies, both on physical connection and on communication protocol level. The natural example for the medium network 105 is the Internet, but other networks, including mobile and private networks, also can be used as a communication medium between the elements of hybrid computer system environment 100. Furthermore, according to one embodiment, more than one networks or communication channels, public and/or private, may compose the medium network 105.

One or more users 150 may utilize different client systems 155 to instantiate or participate in the business processes that are running across the hybrid computer system environment 100. Client systems 155 may be selected from a virtually unlimited variety of user interface devices, including personal computers, system terminals, handhelds, etc.

In one embodiment, one or more tasks or operations of a distributed business process may be started at the service provider environment 110 by a user 150 through a client system 155 via medium network 105. The execution of these operations could result in sending various data, including business requests, to on-premise environment 130 through business interface 113. The data relevant to the execution of the distributed business process are received at the business interface 133 of the on-premise environment 130, and processed at the at least one related system 131. As a result of the processing, feedback data, e.g., execution results and/or further operation requests, may be sent from the on-premise environment 130 to the service provider environment through data interfaces 133 and 113 via medium network 105. In one embodiment, the hosted environment 110 may present the results of the execution of the business process to the at least one users 150 through client systems 155.

In addition to other functions, the monitoring system 115 and the management system 117 observe and control the availability of the systems and subsystems of service provider environment 110, according to one embodiment. The systems and subsystems of the environment 110 may include system 111 related to the executed business processes, business interface 113, network 120, etc. For example, system 111 may encompass a number of subsystems, e.g., printing service, storage service, a number of business and system software applications, etc.

The normal lifecycle of the systems and subsystems of a computer system environment include planned and unplanned downtimes. For example, the one or more business process related systems 111 are stopped for maintenance, software and hardware upgrades, etc. The same applies to the rest of the components of the computer system environment 110. Additionally, there are unplanned downtimes that result from hardware and/or software related problems. In one embodiment, the planned downtimes are scheduled at the management system 117 and maintained in calendar 119. The unplanned downtimes are observed by the monitoring system 115 and may be maintained by the calendar 119, too. The calendar 119 could be a module of the management system 117, or a separate component of the computer system environment 110, e.g., a system or a subsystem. In one embodiment, calendar 119 provides service, e.g., Web based, for accessing the maintained calendar data.

Monitoring system 135 and management system 137 observe and control the availability of the systems and subsystems of the on-premise environment 130. The monitoring system 135 and management system 137 may collect and maintain controlling information, such as downtime data, for the hardware and/or software modules and components of the environment 130. In one embodiment, the monitoring system 135 and/or the management system 137 may collect and store information about planned and unplanned downtimes of the systems and subsystems of the local environment 130. In one embodiment, the downtime data is maintained by a calendar component. Generally, there is no need to provide service access to the calendar information for the local computer system environment 130. Therefore, the calendar data for planned and unplanned downtimes may be simply stored as calendar records 139, e.g., in a database in repository 144.

It may be useful for an entity to monitor the execution of its distributed business processes across the hybrid computer system landscape. For example, the company where the on-premise computer system environment 130 is implemented needs to be aware whether and when the relevant systems and subsystems of the hybrid environment 100 are available. Therefore, according to one embodiment, the service provider environment 110 is enhanced with calendar interface 121 to expose calendar service 119 to the management system 137 and/or to the monitoring system 135 of the on-premise environment 130. Through the calendar interface 121, an instant visibility over the availability of the systems and subsystems of the hosted environment 110 may be achieved at the on-premise environment 130. In one embodiment, a calendar interface 141 may be implemented in the on-premise environment 130 to facilitate the access to the calendar 119. In one embodiment calendar interface 121 may expose calendar 119 as a Web-service.

In one embodiment, the service provider environment 110 may be enhanced by adding monitoring interface 123 to enable access to relevant data and functionalities of monitoring system 115 and/or management system 117. Depending on the embodying technology, the monitoring interface 123 may expose access to a Web-service that can be requested over medium network 105. In one embodiment, monitoring interface 143 may be included in the on-premise environment 130 to transfer requests generated by the management system 137 and/or the monitoring system 135 to the monitoring interface 123. The monitoring interface 143 may receive data relevant to the monitoring and management of the service provider environment 110.

In one embodiment, calendar interfaces 121 and 141 and/or monitoring interfaces 123 and 143 may provide separate physical ports through environments 110 and 130 exchange calendar and monitoring data separately from the business data exchange. Thus, even if one of the communication channels between the different interfaces, e.g., business, calendar or monitoring, fails, the others could be able to continue communication. In one embodiment, calendar interface 121 and monitoring interface 123 could be one and the same component of the hosted computer system environment to provide alternative route for servicing calendar and monitoring requests. Similarly, calendar interface 141 and monitoring interface 143 may be a same component of the local computer system environment.

Figure 2:
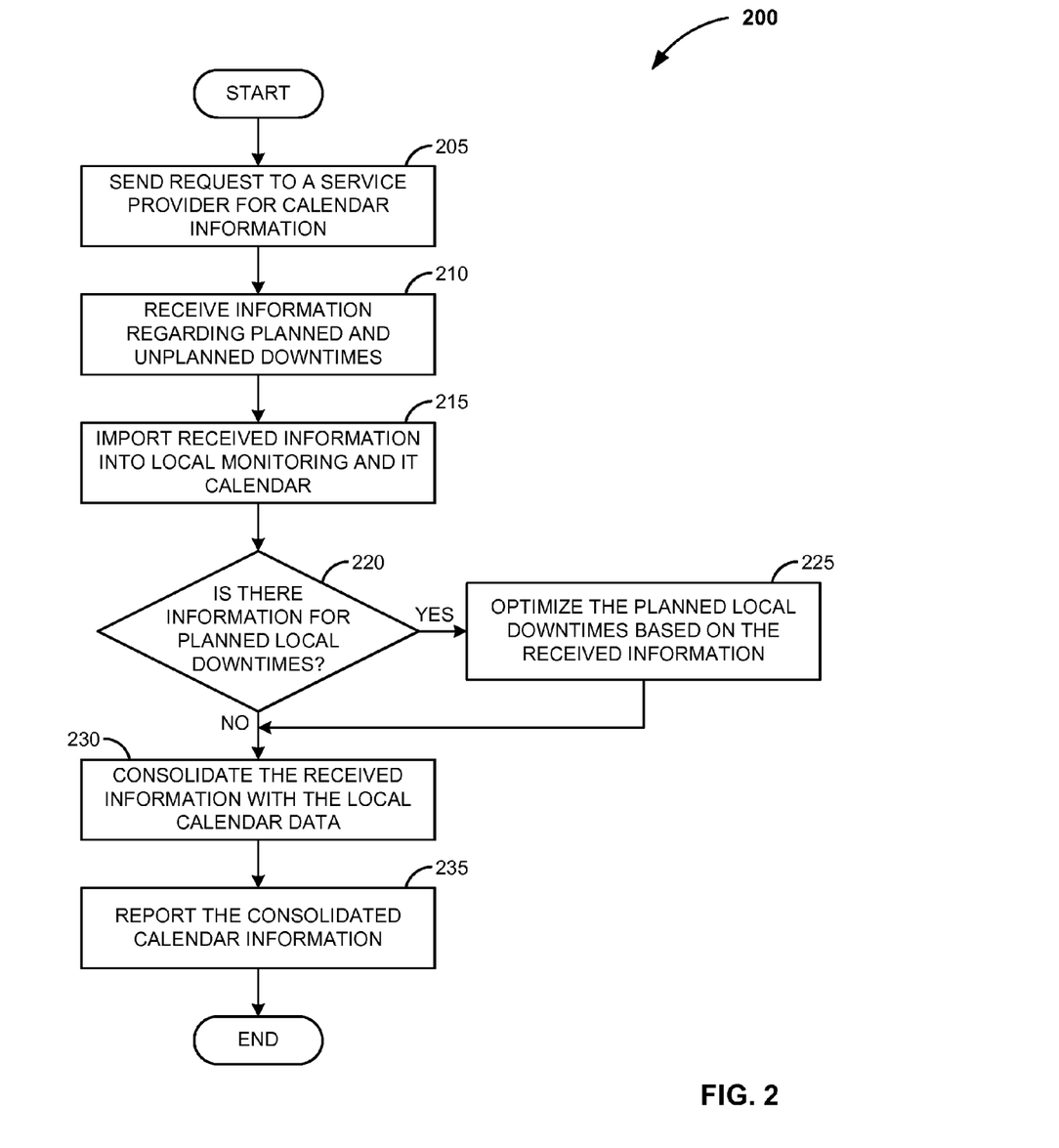
FIG. 2 is a flow diagram illustrating a process of availability evaluation for a hybrid computer system landscape, according to one embodiment.

FIG. 2 shows process 200 of availability evaluation for an entire hybrid computer system landscape where distributed business processes are executed, according to one embodiment. For better understanding, the description of process 200 is based on the hybrid computer system landscape 100 illustrated in FIG. 1. However, it will be obvious for a specialist in the art that the same approach may apply to other hybrid computer system landscapes. At 205, a request for availability calendar information may be generated at an on-premise computer system environment and sent to a service provider hosting an on-demand computer system environment. According to one embodiment, the request is sent to a calendar Web service available at the service provider through a calendar service interface.

At 210, information regarding planned and unplanned downtimes of one or more systems and/or subsystems hosted at the service provider is received. At 215, the received information regarding downtimes is imported into the local calendar system or service. In one embodiment, one or more calendar records may be created at the on-premise computer system environment to store the received calendar data for the planned and unplanned downtimes of the service provider environment.

At 220 it is verified whether there is information for planned local downtimes, e.g., for planned downtimes of the systems or subsystems implemented in the on-premise computer system environment and related to the execution of a distributed business process. According to one embodiment, either of the tasks corresponding to blocks 215 and 220, may be omitted. In the latter case, process 200 may continue directly at 225 with optimizing the planned local downtimes based on the received information. In one embodiment, whenever there are planned downtimes of one or more of the local systems or subsystems, the periods of these downtimes may be synchronized with the downtimes of the systems and subsystems hosted at the service provider. The planned overall downtime for the hybrid computer system landscape may be further optimized based on different criteria taking into account factors like business hours at different locations, expected load, planned batch operations, etc. The synchronization of the downtime information may be performed on system level and on subsystem level based on various predefined algorithms, depending on the business processes distribution between the parts of the hybrid computer system landscape.

When there are no local downtimes planned, or after the optimization of the downtimes, process 200 continues at 230 with consolidating the received information with the local calendar data. The consolidation may involve updating the currently stored calendar records, e.g., in a database repository. At 235, the consolidated calendar information is reported. A number of reporting techniques may be utilized based on different reporting formats and/or based on different reporting channels. For example, a special form may be generated for the IT administrator staff. In one embodiment, one or more personalized emails may be created and sent to one or more users executing tasks in the hybrid computer system landscape. Thus, the users may plan their activity according to the availability of the relevant systems and subsystems.

Table 1 included below shows an operable embodiment of a class or protocol for exchanging calendar data regarding downtimes. The protocol is defined with the help of eXtensible Markup Language (XML) schema as follows:

TABLE 1

| # | Downtime of a System XML Schema |
|---|---|
| A | `<?xml version="1.0" encoding="UTF-8"?>`<br>`<xs:schema xmlns:xs="http://www.w3.org/2001/XMLSchema"`<br>`elementFormDefault="qualified"`<br>`attributeFormDefault="unqualified">` |
| B | `<xs:element name="downtime">`<br>`    <xs:annotation>`<br>`        <xs:documentation>downtime of a`<br>`        system</xs:documentation>`<br>`    </xs:annotation>`<br>`    <xs:complexType>` |
| C | `<xs:attribute name="id" type="xs:string"`<br>`use="required"/>` |
| D | `<xs:attribute name="system_id" type="xs:string"`<br>`use="required"/>` |
| E | `<xs:attribute name="subsystem-id" type="xs:string"`<br>`use="required"/>` |
| F | `<xs:attribute name="type" use="required">`<br>`    <xs:simpleType>`<br>`        <xs:restriction base="xs:string">`<br>`            <xs:enumeration value="planned"/>`<br>`            <xs:enumeration value="unplanned"/>`<br>`        </xs:restriction>`<br>`    </xs:simpleType>`<br>`</xs:attribute>` |
| G | `<xs:attribute name="starttime" type="xs:dateTime"`<br>`use="required"/>` |
| H | `<xs:attribute name="endtime" type="xs:dateTime"`<br>`use="required"/>` |
| I | `<xs:attribute name="severity" use="required">`<br>`    <xs:simpleType>`<br>`        <xs:restriction base="xs:string">`<br>`            <xs:enumeration value="full usage"/>`<br>`            <xs:enumeration value="restricted`<br>`            usage"/>`<br>`            <xs:enumeration value="no usage"/>`<br>`        </xs:restriction>`<br>`    </xs:simpleType>`<br>`</xs:attribute>` |
| J | `<xs:attribute name="expandable" use="required">`<br>`    <xs:simpleType>`<br>`        <xs:restriction base="xs:string">`<br>`            <xs:enumeration value="fix length"/>`<br>`            <xs:enumeration value="max length"/>`<br>`            <xs:enumeration value="predicted`<br>`            length"/>`<br>`            <xs:enumeration value="unknown`<br>`            length"/>`<br>`        </xs:restriction>`<br>`    </xs:simpleType>`<br>`</xs:attribute>` |
| K | `<xs:attribute name="status">`<br>`    <xs:simpleType>`<br>`        <xs:restriction base="xs:string">`<br>`            <xs:enumeration value="planned"/>`<br>`            <xs:enumeration value="active"/>`<br>`            <xs:enumeration value="obsolete"/>`<br>`        </xs:restriction>`<br>`    </xs:simpleType>`<br>`</xs:attribute>` |
| L | `    </xs:complexType>`<br>`</xs:element>`<br>`</xs:schema>` |

The XML schema of the exemplary calendar protocol for downtimes is separated in a number of snippets into different segments or rows to delineate different elements, e.g., attributes. Thus, in segment "A" of Table 1 the header of the XML schema is included. The XML snippets in segment "B" is the beginning of the definition of the "downtime" XML document, e.g., the class for exchanging availability data. In one embodiment, an identifier (ID) is assigned to each downtime instance, e.g., each reported downtime. Respectively, in segment "C" of Table 1, an ID attribute "id" is defined for the "downtime" document or protocol. The assigned ID values may correspond to the subsequent numbers of the reported downtimes in the data exchange.

In one embodiment, a reported downtime, e.g., a downtime with assigned ID, concerns a particular system or subsystem of the hosted computer system environment. Respectively, rows "D" and "E" of Table 1 show the snippet segments defining attributes "system_id" and "subsystem_id" of the "downtime" protocol. For example, the company SAP AG is a service provider of SAP® ByDesign® system. However, a number of subsystems operate as parts of the SAP® ByDesign® system, such as Database stack, ABAP® stack, Adobe® printing service, etc. Thus, one or more downtimes may be reported for the SAP® ByDesign® system, for one or more of the subsystems of the SAP® ByDesign® system, or even for one or more of the different elements or modules of the subsystems of the SAP® ByDesign® system.

Segment "F" of Table 1 contains definition of the "type" property of the "downtime" protocol described by the XML schema. Generally, various types of downtimes based on different criteria are possible, but in the given example they are limited to "planned" and "unplanned" downtimes. In a computer system environment, there may be downtimes planned for different purposes, e.g., hardware and/or software upgrades, data transfers, audits, batch processing, etc. Further, a system or subsystem of the computer system environment may stop operating due to various unexpected reasons, such as failures of hardware components, virus attacks, overloads, electricity drop downs, natural disasters, etc.

The XML code segments in rows "G" and "H" of Table 1 specify the "starttime" and "endtime" attributes of the "downtime" document. These fields provide information when a reported downtime will start or had started, and when it will end or had ended.

One important attribute of the "downtime" interface is "severity" defined in segment "I" of Table 1. The different downtimes may have different impact on the overall availability of the computer system environment. The downtime of a particular system or subsystem may not affect the usage or availability of the computer system environment, e.g., a "full usage" of the provided functionality will be possible. For example, if a monitoring system is down, the business functionality of the computer system environment is not affected. In some cases, "restricted usage" of the services provided at a hosted computer system environment could be possible during the downtime of one or more subsystems. In other cases, the severity of downtimes regarding key systems or subsystems of the computer system environment may permit "no usage", e.g., the network, the data interface, the authorization subsystem, etc.

The "expandable" property of the "downtime" class generally provides information when the system or subsystem affected by the reported downtime will be available, e.g., the length of the downtime. The downtime length could be "fixed" when it is known for how long the respective system or subsystem will not be available, e.g., "=3 h". Alternatively, "max length" of the downtime may be specified when the system will be unavailable for up to a given time period, e.g., "<=3 h". Further, a "predicted length" could characterize a downtime with an approximate period of unavailability, e.g., ≈3 h". Another possible value of the "expandable" attribute is "unknown length", e.g., assigned to downtime due to a reason which have never caused such downtime before.

Segment "K" of Table 1 defines the "status" property of a downtime. For example, a downtime of a system or a subsystem may be "planned", e.g., for the next week; "active", e.g., currently happening; or "obsolete", e.g., happened in the past. The code snippets in segment "L" of Table 1 close the outer definitions structures of the XML schema of the "downtime" protocol.

In one embodiment, the availability evaluation of a hybrid computer system landscape as illustrated with FIG. 2 allows generation of consolidated calendar data for the planned and unplanned downtimes at a particular moment. In one embodiment, this moment is when the request for calendar information is received and processed by the service provider. However, the availability and operability of the systems and subsystems of a computer system environment may change dynamically. Therefore, the management and/or monitoring systems should continuously check and handle unplanned availability issues in such computer system environments.

Figure 3:
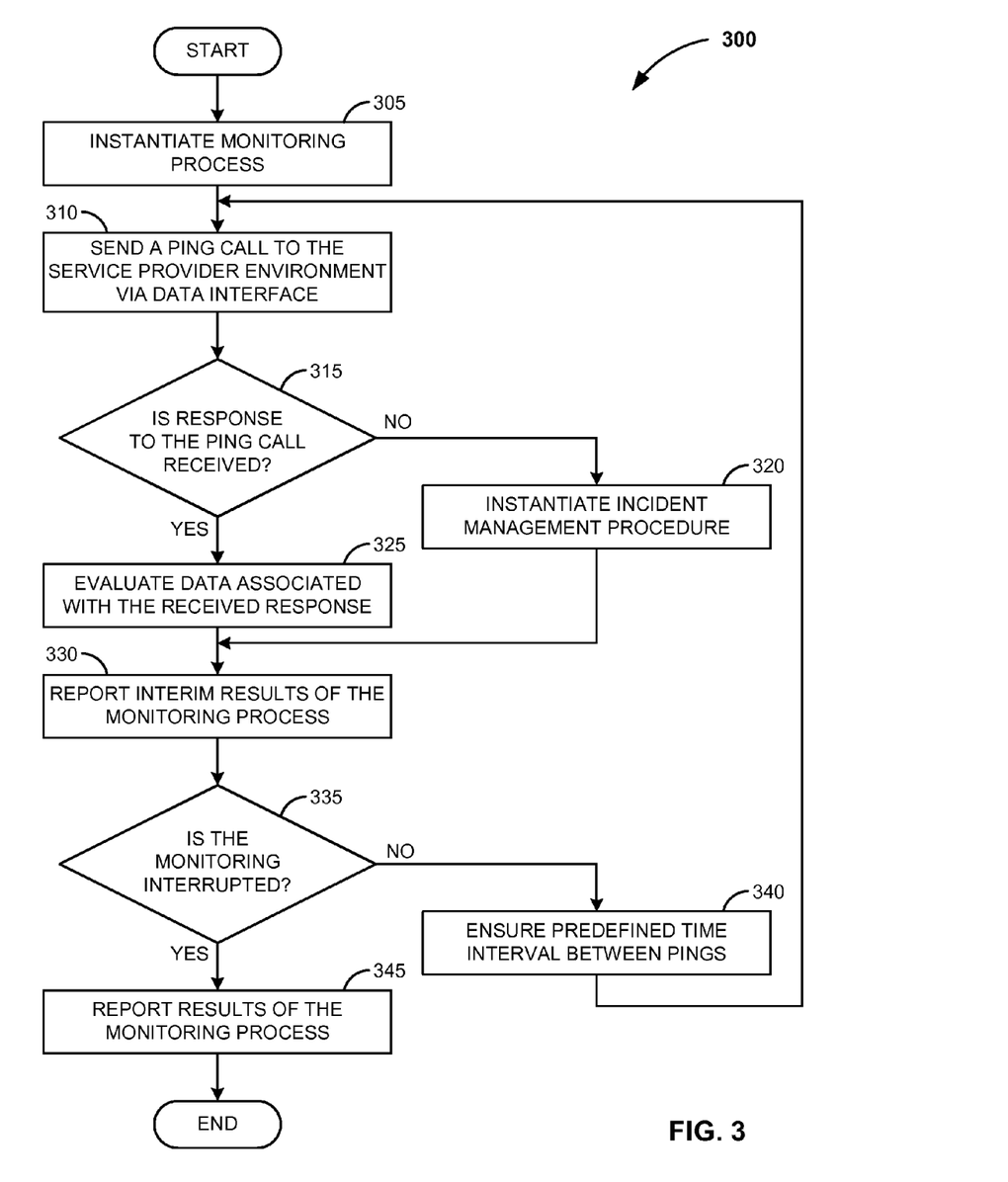
FIG. 3 is a flow diagram, illustrating a process of continuous monitoring of availability of systems and subsystems across hybrid computer system landscape, according to one embodiment.

FIG. 3 shows process 300 for continuous monitoring of the availability of one or more systems and subsystems across hybrid computer system landscapes, according one embodiment. For better understanding, process 300 is described with the assumption that a hybrid computer system landscape with the structure of the hybrid computer system landscape 100 illustrated with FIG. 1 is monitored. However, one of ordinary skill in the art would recognize that same principles and process elements apply to hybrid computer system landscapes of other types or with other structure. Process 300 starts at 305 with instantiating monitoring process across the hybrid computer system landscape. In one embodiment, the instantiation of the monitoring process includes the initial evaluation of the availability of the hybrid computer system landscape as illustrated in FIG. 2.

Based on the consolidated downtime information, a redundant data request or a ping call is sent from the on-premise computer system environment to the service provider via data interface, e.g., Web-services interface, at 310. In one embodiment, the ping call may request sample service or data transfer from one or more systems and subsystems of the service provider environment. The ping may be directed to the one or more systems and subsystems based on the consolidated calendar information for their availability. At 315, it is verified whether a response to the ping call is received. When no response is received, e.g., for a predefined time period, incident management procedure is instantiated at 320. However, if a response to the ping call is received, data associated with the received response is evaluated at 325. For example, the time period between sending the ping call and the receiving the response is measured. The contents of the response may also be evaluated, e.g., based on predefined relevancy criteria.

At 330, interim results of the monitoring process are reported, e.g., based on the evaluated data. Such interim reporting may take various forms based on specified requirements, e.g., instant messages, emails, data forms, etc. In one embodiment, the reporting at 330 may be skipped when the ping request only confirms the availability or unavailability of the one or more systems and subsystems of the service provider computer system environment according to the consolidated calendar data. At 335, a check is performed to determine whether the monitoring process has been interrupted. There may be different reasons for interrupting the monitoring, e.g., user intervention, planned stop, system failure, etc. For example, the one or more systems and subsystems of the service provider environment, or the data interface, may enter period for planned downtime, when their monitoring is not necessary. When the monitoring is ongoing, e.g., is not interrupted, process 300 continues back at 310 with sending a ping call, after ensuring, at 340, predefined intervals between the pings. Process 300 ends at 345 with a final report for the results of the monitoring.

In one embodiment, the ping calls of the multi-phase monitoring process 300 are sent using business data interfaces and via business data channels. Thus, the pings, even when directed to other systems or subsystems check the operability of the business data communications of the hosted computer system environment. Alternatively, a separate monitoring interface may be utilized to check the availability of the one or more systems and subsystems, regardless the state of the business data interfaces and channels.

Figure 4:
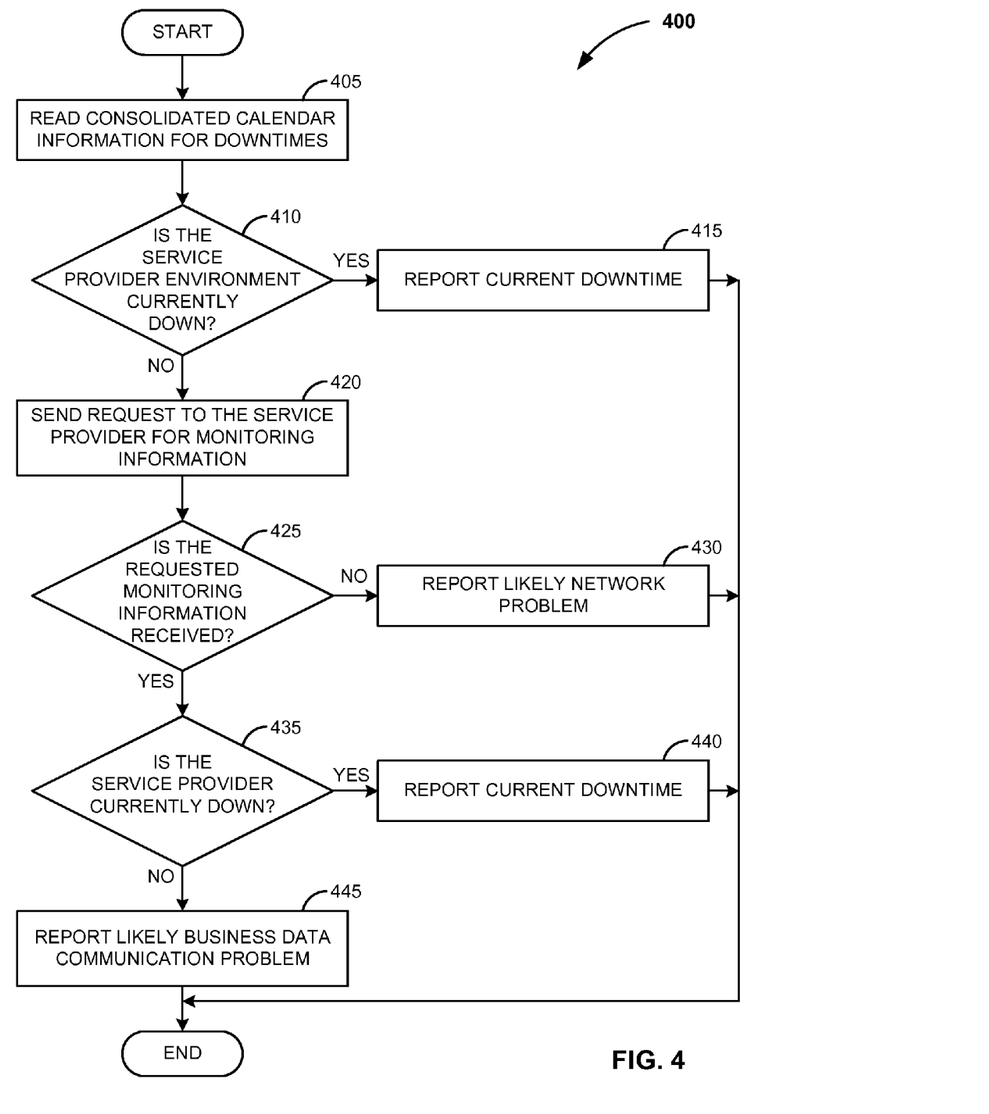
FIG. 4 is a flow diagram illustrating a process of incident management in hybrid computer system landscape, according to one embodiment.

According to one embodiment, a separate monitoring interface may be utilized for incident management as shown in FIG. 4 with process 400. According to the illustrated incident management process 400, at 405, the locally stored consolidated calendar information for planned and unplanned downtimes is read. At 410, a check is performed, in the read calendar data, to determine whether the service provider environment is currently down. The check performed at 410 may concern the state of a particular system or subsystem of the computer system environment hosted by the service provider. For example, the check at 410 may be focused on the state of the one or more systems and subsystems pinged as shown in FIG. 3. If the check shows that the hosted environment or the pinged one or more systems and subsystems are in planned or unplanned downtime period according to the consolidated calendar data, process 400 ends at 415 with reporting the current downtime.

However, if the check at 410 does not find applicable downtime data, process 400 continues at 420 with sending request to the service provider for current monitoring information, e.g. regarding the pinged one or more systems and subsystems. Such a request may utilize a special monitoring interface to access monitoring service data. In one embodiment, the monitoring interface may be exposed as a Webservice. Further, the monitoring request may be routed via physical port that is different from the port dedicated for business data requests. Thus, the monitoring request could still be processed even if the problem with the ping request is due to a failure of a business data interface or port.

Table 2 below shows XML schema defining protocol or class for exchanging monitoring information between different environments of a hybrid computer system landscape, according to one embodiment:

TABLE 2

| # | Monitoring Data XML Schema |
|---|---|
| A | `<?xml version="1.0" encoding="UTF-8"?>`<br>`<xs:schema xmlns:xs="http://www.w3.org/2001/XMLSchema"`<br>`elementFormDefault="qualified"`<br>`attributeFormDefault="unqualified">` |
| B | `<xs:element name="Monitor">`<br>`<xs:annotation>`<br>`<xs:documentation>monitoring`<br>`data</xs:documentation>`<br>`</xs:annotation>`<br>`<xs:complexType>` |
| C | `<xs:attribute name="id" type="xs:ID"`<br>`use="required"/>` |
| D | `<xs:attribute name="system-id" type="xs:string"`<br>`use="required"/>` |

TABLE 2-continued

| # | Monitoring Data XML Schema |
|---|---|
| E | <xs:attribute name="subsystem-id" type="xs:string" use="required"/> |
| F | <xs:attribute name="timestamp" type="xs:dateTime" use="required"/> |
| G | <xs:attribute name="availability" type="xs:float" use="optional"/> |
| H | <xs:attribute name="accesstime" type="xs:time" use="optional"/> |
| I | </xs:complexType></xs:element></xs:schema> |

Again, the XML schema of the exemplary monitoring protocol is separated in a number of snippets into different segments or rows according to its different elements. Row "A" of Table 2 contains the header snippet of the XML schema. In the next segment in row "B" is the beginning of the definition of the "monitor" XML document. As illustrated by the XML code segment in row "C", a unique ID is assigned per monitoring request or ping sent through the monitoring interface, e.g., the "id" attribute of the monitoring class. The monitoring requests may ping particular one or more systems and subsystems of the hosted environment that has not responded to the data pings. Respectively, rows "D" and "E" define "system id" and "subsystem id" attributes of the monitoring protocol identifying of the system and/or subsystem pinged by the monitoring request. The "timestamp" attribute defined in row "F" of Table 2 shows the time of sending of the monitoring request. The snippet in row "G" defines the "availability" attribute that gives information whether the monitored system or subsystem was up or down. Finally, the "accesstime" attribute of the protocol defined in row "H" gives the time period for serving the monitoring request. The snippets in row "I" close the opened XML schema definition structures.

The information fields of the monitoring protocol as illustrated with Table 2 provide sufficient information that can help the local computer system environment evaluate the incident occurred during the data pings. In one embodiment, other attributes may be defined to exchange further information between the monitoring and/or management systems of the hosted environment and the monitoring and/or management systems of the local environment for multi-phase and real time monitoring of the hybrid system landscape.

After sending the request at 420, a check is performed at 425 to determine whether the requested monitoring information is received. If there is no response to the monitoring request, e.g., no information is received, process 400 ends at 430 with reporting likelihood of network problem. The reason for such conclusion is that no responses are received for the pings sent through both business data interface via business data communication port and through monitoring interface via monitoring port. The other possible reason for the incident would be that both pinged business system or subsystem, and the monitoring system are down.

When the local management or monitoring system receives a response to the monitoring request sent at 420, a check is performed at 435, based on the received data, to determine whether the service provider is currently down. The state of the overall hosted computer system environment may be checked at 435. In one embodiment, the current state of the initially pinged one or more systems and subsystems hosted at the service provider may be specifically checked. According to the result, process 400 may end at 440 with reporting current downtime of the hosted environment, system or subsystem, or with reporting likely business data communication problem, when the initially pinged systems are available.

In one embodiment, processes 200, 300 and 400 illustrated with FIG. 2, FIG. 3 and FIG. 4, respectively, may present multi-phase monitoring of hybrid system landscapes from the perspective of a service provider hosting computer system environment as well. In other words, the observation and management of the availability of the systems and subsystems related to the execution of distributed business processes is performed not by the entity using on-premise implemented control center, but by a control center at the third party service provider. According to such embodiment, the service provider may ping the on-premise computer system environment with specific data and monitoring requests to check the availability of selected systems and/or subsystems. Furthermore, the on-demand computer system environment downtimes may be optimized based on information received by an on-premise calendar service. The extent of such monitoring of a hybrid computer system landscape by the third party may be subject of a predefined contract between the entity and the service provider.

Figure 5:
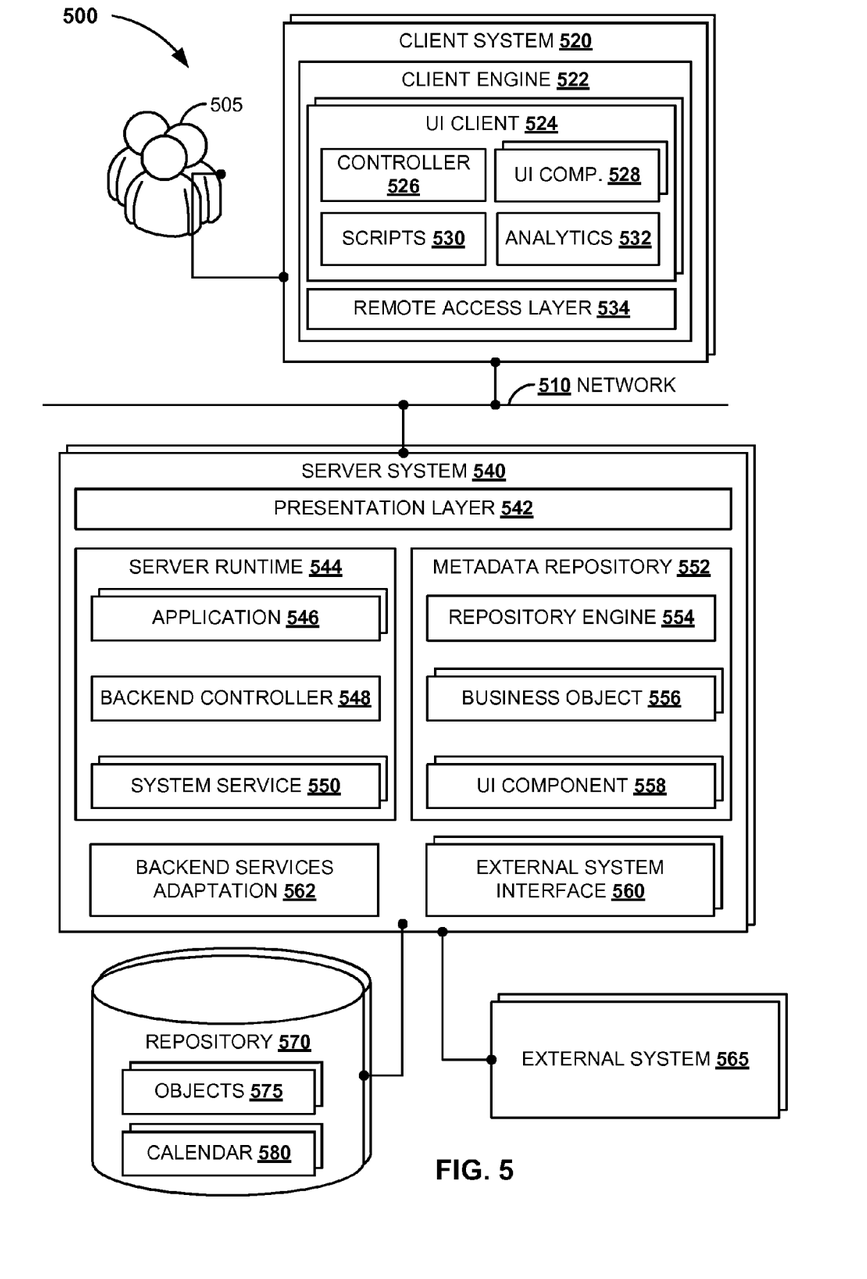
FIG. 5 is a block diagram illustrating a computer system environment where is performed, according to one embodiment.

FIG. 5 is a block diagram showing computer system environment 500 where multi-phase monitoring of hybrid computer system landscapes is performed, according to one embodiment. The computer system environment 500 includes a rather simplified example of classic client-server architecture. One or more shareholders or users 505, e.g., business product users, administrative users, etc., operate on one or more client systems 520. Users 505 may request different services or execute various operations available within client systems 520, or provided by one or more server systems 540 via network 510. The illustrated server systems 540 represent one or more backend nodes in the computer system environment 500. Some of the elements of the computer system environment 500 resemble the structure and functionality of software modules developed by SAP AG. However, structures with similar functionalities could be found in software products developed by other vendors, as well. Alternative embodiments may utilize other kinds of computer system architectures.

The involved client systems 520 may have similar or different structures where one or more of the illustrated modules are replicated. One or more users 505 may operate within one or more instances of user interface (UI) client 524 of one or more of client systems 520. Different users 505 may exclusively access different instances of the UI client 524 within a same client system 520.

In one embodiment, any of the client systems 520 may execute a standalone client application, e.g., client engine 522, to interact with the backend server system 540. Alternatively, an intermediate layer may be downloaded to any of the client systems 520 as an extension of a running Internet browser. Such intermediate layer may be also illustrated as client engine 522. The standalone client application and the intermediate layer may have similar components and functionality. Client engine 522 takes responsibility for rendering the necessary client functionality, and also for communicating with server systems 540 via network 510 when necessary.

The client engine 522 includes UI client instances or sessions 524 that may also embed into a browser integrated framework. The UI client 524 may be a part of any popular browser integrated framework, e.g. Silverlight® provided by Microsoft Corp., Flex® provided by Adobe Systems Inc., JavaFX® originally developed by Sun Microsystems Inc., etc. In one embodiment, the client engine 522 and UI client 524, respectively, may be desktop application, for example, a .NET® application rendering a UI through a Windows Prosecution Foundation (WPF) system. The UI client 524 accesses the necessary business data at the backend 540 through remote access layer 534 via network 510. In one embodiment, no dedicated UI server or client programs are needed. The communication with the backend 540 may include extracting, storing and updating data. The data may be transported to repositories 570, especially when backend 540 implements a number of server nodes in separate computer system environments.

In one embodiment, users 505 generate services requests at UI client 524. UI components module 528 instantiates one or more appropriate graphical user interface (GUI) screens or controls in response to the user request. The behavior of the UI components is managed by controller 526. The controller 526 makes sure that all instantiated controls in the UI components 528 are initialized. The controller 526 is also responsible for the execution of any configured operation triggered by events corresponding to the instantiated controls. In case when some of the operations involve execution of script segments, the controller 526 may trigger the execution of these scripts via scripts module 530. In one embodiment, scripts module 530 is a frontend scripting engine. Analytics module 532 may be used for frontend data processing when necessary.

In one embodiment, the backend server system 540 utilizes presentation layer 542 to connect to the Internet and/or to other public or private networks, and to provide access for the UI client sessions 524 to underlying business functions and data structures. For example, the presentation layer 542 may generate the UI object model underlying the UI controls instantiated in the UI components module 528 at the client systems 520. In one embodiment, presentation layer 542 may be part of the server runtime 544.

The server runtime 544 provides an environment where one or more software applications 546 are executed. For example, the applications 546 may provide a number of business services for the users 505, where various operation requests related to the business services are created at client systems 520. The requests are translated to corresponding process tasks performed by the applications 546 executed in server runtime 544.

In one embodiment, the server runtime 544 includes backend controller 548 for one or more UI client sessions 524 to handle the requested UI components, e.g., when a UI client session 524 triggers an initialization of a UI component for the first time. The backend controller 548 may manage the collaboration between the requested UI components and one or more underlying business objects. System services 550 in the server runtime 544 may be used to administer the characteristics of the server runtime 544, e.g., its engine parameters, the user access to one or more components, the processes execution, the communication with other runtime environments, like, external systems, databases, etc. In one embodiment, system services 550 may also provide deployment, setup and change management of software components.

Metadata repository 552 is generally the place where metadata about the computer programs deployed in the server system 540 are preserved, according to one embodiment. There are different kinds of metadata that could be maintained by the metadata repository 552. For example, the repository 552 keeps the description of the business objects 556 underlying the applications 546. In one embodiment, metadata repository 552 keeps description of the available UI components 558 and the relationships between them as designed.

Repository engine 554 manages the metadata and the collaboration with the server runtime 544 at one hand, and with various external systems 565 at the other hand. The external systems 565 may render services and/or corresponding UI components to the backend 540 as defined in the metadata. The external systems 565 are available via external system interfaces 560. In one embodiment, one or more external systems 565 may be hosted by a third party service provider as part of the hybrid computer system landscape. External systems 565 could provide monitoring and availability management information via the external system interface 560. The communication between server system 540 and the external systems 565 may utilize various network medium solutions.

In one embodiment, backend services adaptation 562 represents a layer that helps to adjust the designed UI or rendered UI components to a set of normalized business objects available at the server system 540. In a multi-server system environment, e.g., in a cluster of more than one server system nodes 540, repository 570 may be used to persist different kinds of common data, including programming code, business data, metadata, etc. In one embodiment, one or more different repositories 570 may be assigned to different computer system environments defined in the computer system landscape 500.

In one embodiment, users 505 may instantiate, change or execute a program component, a data object or some other type of computer system artifact by manipulating UI components 528 associated with a particular application or software tool. The UI components 528 may be available within GUI environment of the UI client 524. The manipulations of the UI components 528 may trigger execution of various system or application procedures in server runtime 544. Further, the manipulations of the UI components 528 may lead to changes in the metadata repository 552, e.g., changes in the definitions of the UI components 558, even to changes in the descriptions of the business objects 556, etc.

For example, by manipulating UI components 528, a user 505 may launch a monitoring of the availability of the systems and subsystems defined or implemented in the computer system environment 500. The monitoring artifacts or objects, e.g., programming, business, data, etc., could be stored together with other objects 575 in repository 570. The monitoring process may collect availability information for the systems and subsystems in computer system environment 500, including the components of the client systems 520 and the server systems 540. One or more calendar records 580 could be generated by the monitoring process in repository 570, e.g., with the planned and unplanned downtimes. Server system 540 could automatically optimize the calendar information to maximize the overall availability of the hybrid computer system landscape, e.g., for particular business processes.

Accordingly, service runtime 544 may execute applications 546 related to business processes, as well as components 546 to 550 that perform monitoring and system management functions. In one embodiment, the monitoring functionality implemented in computer system environment 500 may include the tasks described as elements of processes 200, 300 and 400 illustrated in FIG. 2, FIG. 3 and FIG. 4, respectively.

In one embodiment, a user, such as system administrator or manager, may change the calendar records 580 with planned downtimes of some of the modules of the computer system environment 500 by using the UI client 524 functionality to request particular services from the runtime 544. In one embodiment, various reports may be produced in the server system 540 and/or in the client system 520 based on the calendar data. For example, applications 546 may read calendar records 580 based on descriptions defined in metadata repository 552. Various scripts 530 and analytics 532 at UI client may further process the calendar data. Availability reports may be sent to external systems 565 as well. The data in the reports may include information for the availability of particular distributed business processes.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
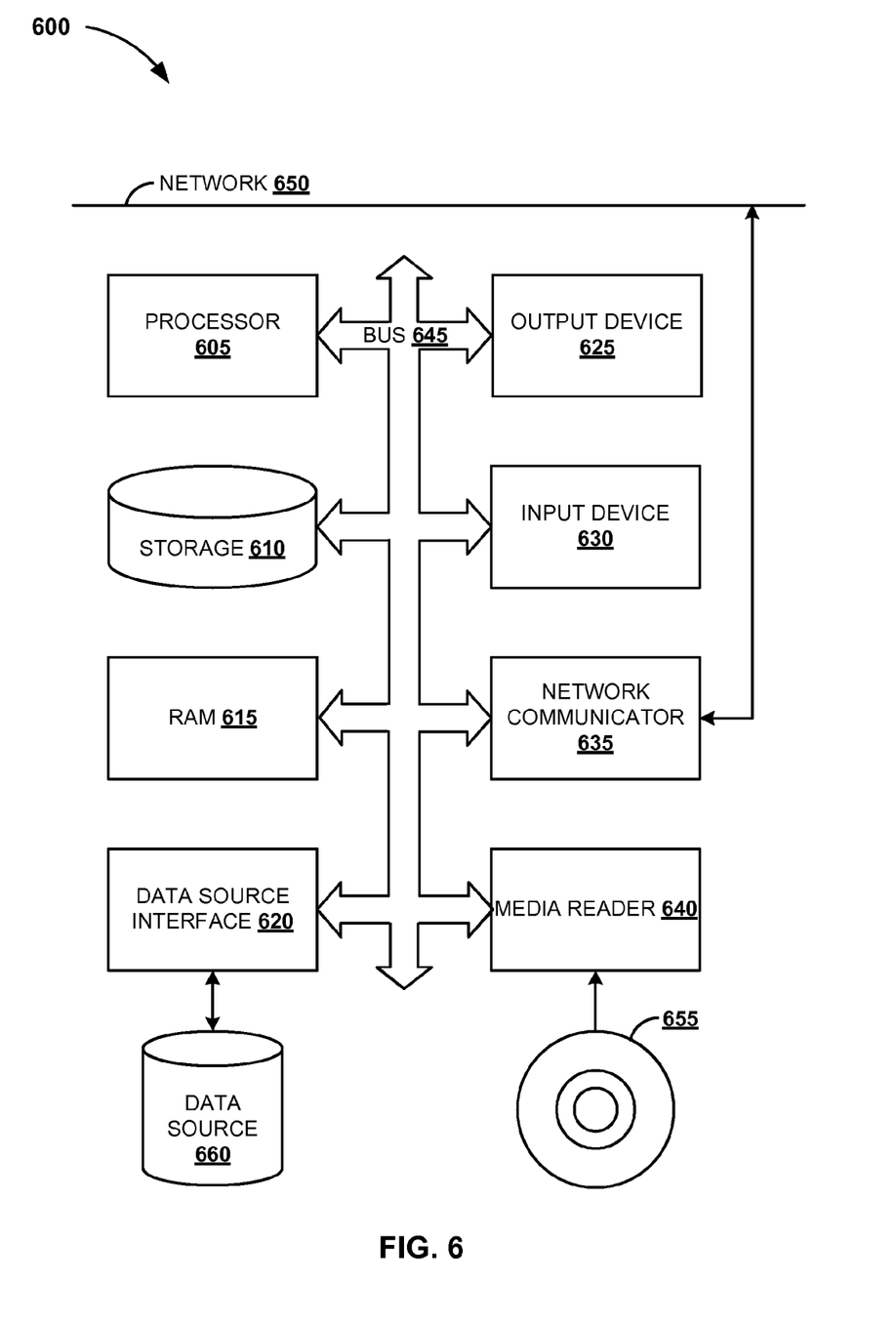
FIG. 6 is a block diagram of an exemplary computer system to execute multi-phase monitoring of hybrid computer system landscapes, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer system monitoring availability in a hybrid computer system landscape, the system comprising:

a memory to store computer executable instructions; and a processor coupled to the memory and operable to execute the instructions to generate:

a calendar component to receive data regarding at least one downtime of at least one component of a computer system environment of the hybrid landscape hosted by a first entity, and a management component to synchronize data regarding at least one downtime of at least one component of a computer system environment of the hybrid landscape hosted by a second entity with the received data to maximize availability of at least one business process running across the hybrid landscape.

2. The system of claim 1, wherein the processor operable to further execute the instructions stored in the memory to send a calendar service request to the first entity for the data regarding the at least one downtime of the at least one component of the computer system environment of the hybrid landscape hosted by the first entity.

3. The system of claim 1, wherein the processor is further operable to execute the instructions stored in the memory to generate:

a business interface to route a ping request to the at least one component of the computer system environment hosted by the first entity.

4. The system of claim 1, wherein the processor is further operable to execute the instructions stored in the memory to generate:

a monitoring request to the environment hosted by the service provider; and a monitoring interface to route a monitoring request to the first entity regarding the state of the at least one component of the computer system environment hosted by the first entity, wherein the monitoring request is sent based on the result of the ping request.

5. A non-transitory computer-readable medium storing instructions, which when executed cause a computer system to:

receive calendar data regarding at least one downtime of at least one component of a computer system environment hosted by a first entity;

consolidate the received calendar data with calendar data for at least one downtime of at least one component of a computer system environment hosted by a second entity; and evaluate availability related to at least one process running across the environment hosted by the first entity and the environment hosted by the second entity, wherein the availability is evaluated based on the consolidated calendar data.

6. The computer-readable medium of claim 5, wherein receiving the calendar data for the environment hosted by the first entity comprises:

receiving the data regarding the at least one downtime of the at least one component of the environment hosted by the first component in response to a calendar service request.

7. The computer-readable medium of claim 5, wherein consolidating the received calendar data comprises:

synchronizing the at least one downtime of the at least one component of the computer system environment hosted at the second entity with the at least one downtime of the at least one component of the computer system environment hosted by the first entity.

8. The computer-readable medium of claim 5 storing instructions, which when executed cause the computer system further to:

schedule an execution of the at least one process across the environment hosted by the first entity and the environment hosted by the second entity based on the consolidated calendar data.

9. The computer-readable medium of claim 5 storing instructions, which when executed cause the computer system further to:

send a ping request to the at least one component of the computer system environment hosted by the first entity.

10. The computer-readable medium of claim 5 storing instructions, which when executed cause the computer system further to:

send a monitoring request to the computer system environment hosted by the first entity based on failure to receive response to a data request.

11. The computer-readable medium of claim 10 storing instructions, which when executed cause the computer system further to:

report a problem with the computer system environment hosted by the first entity based on the status of the monitoring request.

12. The computer-readable medium of claim 10 storing instructions, which when executed cause the computer system further to:

route the monitoring request via a port separate from a business data exchange port.

13. A computer implemented method of monitoring availability in a hybrid computer system landscape, wherein the hybrid landscape includes a computer system environment hosted by a service provider and a computer system environment of an entity, the method comprises:

receiving calendar information via a computer network, wherein the calendar information includes data regarding at least one downtime of at least one component of the environment hosted by the service provider;

consolidating by a processor into a memory the received calendar information with a local calendar information for at least one downtime of at least one component of the environment of the entity; and reporting availability based on the consolidated calendar information and related to at least one business process running in the hybrid system landscape.

14. The method of claim 13, wherein receiving the calendar information for the service provider comprises:

receiving the data regarding the at least one downtime in response to a calendar service request sent through a calendar interface.

15. The method of claim 13, wherein consolidating the received calendar information comprises:

synchronizing the at least one downtime of the at least one component of the environment of the entity with the at least one downtime of the at least one component of the environment hosted by the service provider.

16. The method of claim 13 further comprising:

scheduling an execution of the at least one business process across the environment hosted by the service provider and the environment of the entity based on the consolidated calendar information.

17. The method of claim 13 further comprising:

sending a ping request to the at least one component of the environment hosted by the service provider through a business interface.

18. The method of claim 13 further comprising:

instantiating an incident management procedure based on failure to receive response to a ping request.

19. The method of claim 18, wherein instantiating the incident management procedure comprises:

sending a monitoring request to the environment hosted by the service provider; and reporting one or more of a network problem, data interface problem, or a current downtime of the at least one component of the environment hosted by the service provider based on the status of the monitoring request.

20. The method of claim 18, wherein sending the monitoring request comprises:

sending the monitoring request through an interface separate from the business interface.

* * * * *